United States Patent [19]

Jain

[11] Patent Number: 5,602,423
[45] Date of Patent: Feb. 11, 1997

[54] DAMASCENE CONDUCTORS WITH EMBEDDED PILLARS

[75] Inventor: Manoj K. Jain, Plano, Tex.

[73] Assignee: Texas Instruments Incorporated, Dallas, Tex.

[21] Appl. No.: 479,989

[22] Filed: Jun. 7, 1995

Related U.S. Application Data

[62] Division of Ser. No. 333,015, Nov. 1, 1994.

[51] Int. Cl.$^6$ .......... H01L 29/40; H01L 23/48; H01L 23/52
[52] U.S. Cl. .......... 257/752; 257/763; 257/764; 257/767; 257/768; 257/760; 257/765
[58] Field of Search ............ 257/752, 751, 257/737, 763, 764, 768, 760, 765, 437, 301, 767

[56] References Cited

U.S. PATENT DOCUMENTS

| | | |
|---|---|---|
| 4,944,836 | 7/1990 | Beyer et al. . |
| 4,956,313 | 9/1990 | Cote et al. . |
| 5,262,354 | 11/1993 | Cote et al. .......... 257/763 |
| 5,272,117 | 12/1993 | Roth et al. . |
| 5,300,813 | 4/1994 | Joshi et al. .......... 257/752 |
| 5,426,330 | 6/1995 | Joshi et al. .......... 257/752 |
| 5,471,091 | 11/1995 | Pasch et al. .......... 257/752 |
| 8,315,529 | 9/1994 | Jain et al. . |

*Primary Examiner*—Carl Whitehead, Jr.
*Attorney, Agent, or Firm*—James E. Harris; Richard A. Stoltz; Richard L. Donaldson

[57] ABSTRACT

A semiconductor device is disclosed which uses an embedded pillar 38 to prevent damage (e.g. dishing, smearing, overetching) to damascene conductors during fabrication, particularly where such conductors are relatively large. The device comprises an insulating layer 22 formed on a substrate 20 and having a substantially planar upper surface with a plurality of channels 26, 34 formed therein. Channel 34 may be described as comprised of contiguous narrow channel segments (including right segment 40, top segment 41, and left segment 42) enclosing pillar 38, which has a top surface substantially coplanar with the upper surface of layer 22. In one embodiment, pillar 38 is formed integrally as part of layer 22. In alternative embodiments, pillar 38 may be formed from an additional insulating or conducting layer. The device further comprises conductors inlaid in the channels such that the top surface of the conductors is substantially coplanar with the upper surface of layer 22, with at least one of the conductors comprising a set of contiguous conducting segments (e.g. including 44, 46) inlaid so as to surround pillar 38.

4 Claims, 5 Drawing Sheets

DAMASCENE CONDUCTORS WITH EMBEDDED PILLARS

CROSS-REFERENCE TO RELATED APPLICATIONS

This is a division of application Ser. No. 08/333,015, filed Nov. 1, 1994.

The co-assigned application 08/315,529 filed by Jain on Sep. 30, 1994 (TI#TI-19761) is included herein by reference.

FIELD OF THE INVENTION

This invention relates to interconnection layers for microelectronic devices, and more specifically to interconnection layers formed by a damascene process.

BACKGROUND OF THE INVENTION

Integrated circuits such as those found in computers and electronic equipment may contain millions of transistors and other circuit elements fabricated on a single crystal silicon chip. To achieve a desired functionality, a complex network of signal paths must be routed to connect the circuit elements distributed on the surface of the chip. Efficient routing of signals across a chip becomes increasingly difficult as integrated circuit complexity grows. To ease this task, interconnection wiring, which not too many years ago was limited to a single level of metal conductors, on today's devices may contain as many as five (with even more desired) stacked interconnected levels of densely packed conductors.

Conductor/insulator interconnect layers are typically formed by one of two general techniques. In the first technique, a conductive film is deposited over a preferably planar insulation layer (which usually contains vias, or through holes, allowing the conductive film to contact underlying circuit structure where electrical connections are needed). Portions of the conductive film are selectively etched away using a mask pattern, leaving a network of separate conductors with similar thickness and generally rectangular cross-section lying on the insulation layer. Usually, after patterning, the conductors are covered with an interlevel dielectric before additional conducting layers are added.

The second technique is known as damascene (after the inlaid metal technique perfected in ancient Damascus for decorating swords and the like), and involves etching a series of channels in the top surface of a preferably planar insulation layer and then depositing a conductive film over the etched insulation layer (preferably filling the channels with conductive material). A subsequent planarization, e.g. by chemical-mechanical polishing (CMP), removes the conductive film from the topmost surface of the insulation layer, but leaves conducting material in the channels, thereby forming a series of inlaid patterned conductors. This process is described in detail in U.S. Pat. No. 4,944,836, issued to Beyer et al. on Jul. 31, 1990.

Damascene is particularly attractive for submicron interconnect fabrication: chemical etching processes are known which can anisotropically (i.e. unidirectionally) etch insulators such as silicon dioxide to form high-aspect (i.e. deep and narrow) channels with vertical walls; it allows the use of low resistivity, high copper content conductive materials which cannot currently be patterned successfully by dry chemical etching; and, the process by nature results in planarized interconnection layers, which are highly desirable for multilevel interconnections.

An improved damascene process is claimed by Cote et al. in U.S. Pat. No. 5,262,354, issued on Nov. 16, 1993. Cote et al. cite several problems with damascene polishing used directly on low resistivity, soft metals such as Al-Cu alloys, including scratching, smearing, corrosion, and dishing (conducting material may be removed to a level below the top surface of the insulator). Their approach to this problem involves depositing the soft metal such that the channels are filled to between a few hundred nm and a few hundred Å of the top surface of the dielectric, and capping this with a wear-resistant, higher resistivity layer (e.g. a refractory metal such as tungsten) before polishing. One difficulty with such an approach is the exacting control required for an anisotropic deposition of the soft metal to the required depth tolerance, particularly given normal variations in trench depth and metal deposition rate across a wafer. The higher resistivity refractory cap layer also results in an increase in resistance for all conductors fabricated on a given level, unless compensations in conductor height and/or width are incorporated in the design.

SUMMARY OF THE INVENTION

The present invention provides interconnect structures and methods for improved damascene conductors, including low-resistivity, soft metal damascene conductors, without requiring additional process steps or hard metal overcoats. It has now been recognized that problems such as conductor dishing and overetching observed during polish are related to conductor width and may therefore be controlled by adjusting the effective conductor "width" as it relates to the polishing process.

A typical interconnection level contains conductors of several different widths. Conductors which will carry a small current during operation may be layed out using a minimum width established in the design rules for a specific fabrication process. Other conductors which must carry larger current or conform to other design requirements (e.g. alignment tolerances) may be layed out with larger widths. It has now been observed that the wider conductors (e.g. several microns in width) may be severely dished during damascene polishing, while narrow conductors (e.g. 0.5 micron in width) polished simultaneously experience little or no dishing. Although the cause for this phenomenon is not yet fully understood, one theory is that a compliant polishing pad may deform to some extent at the location of the winder channel, thus rapidly removing conducting material from the channel. On the other hand, the pad "skims over" narrow channels, and is unable to etch conducting material from the narrow channel appreciably faster than the etch rate of the surrounding insulator.

During damascene polishing, polish conditions are generally selected which provide a much faster relative polish rate for the conductive film, as compared to the polish rate of the underlying insulating layer. The present invention therefore realizes that pillars of an appropriate height may be dispersed within a large channel as wear-resistant polish pad supports, before deposition of a conducting film. The pillars serve structurally to prevent overetching or dishing in such a large channel by acting as an etch stop for polishing of the conducting material deposited over a wide trench. One method of forming such pillars is to make provision for them on the mask used to pattern the channels, such that a pillar of the underlying insulating layer material remains after the channel is formed. Alternately, a separate layer of either insulating or conducting material (harder to polish than a subsequent conducting film) may be deposited and patterned to form a pillar within a channel.

Therefore, the present invention provides a method of forming an inlaid conductor on a semiconductor device having an insulating layer with a substantially planar upper surface deposited on a substrate. This method comprises removing at least a top portion of the insulating layer in a predefined area on the device to form a contiguous channel in the upper surface of the insulating layer. The method further comprises forming at least one pillar within the channel, the pillar having a top surface substantially coplanar with the insulating layer upper surface. The method further comprises depositing a conducting film over the insulating layer and polishing the semiconductor device such that the top surface of the conducting film is substantially coplanar with the upper surface of the insulating layer to create the inlaid conductor in the channel. The pillar serves as a stop to prevent damage to the inlaid conductor during the polishing step.

The present invention also provides a method of forming a damascene interconnection layer on a semiconductor device having a first insulating layer with a substantially planar upper surface deposited on a substrate. The method comprises removing sections of at least a top portion of the first insulating layer in a predetermined pattern to form a plurality of non-contiguous channels in the upper surface of the layer. At least one of the channels comprises a set of contiguous channel segments which surround at least one pillar extending substantially to the level of the upper surface of the first insulating layer. The method further comprises depositing a conductive film over the first insulating layer and chemical-mechanical polishing the device in a manner which removes the conducting film at a faster rate than it removes the first insulating layer. CMP preferably ends with the top surface of the conducting film being substantially planar with the upper surface of the first insulating layer, thus forming a plurality of inlaid conductors in the channels.

The present invention also provides for a damascene metallization structure on a semiconductor device, comprising a first insulating layer formed on a substrate and having a substantially planar upper surface with a plurality of channels formed therein. The structure further comprises conductors inlaid in the channels such that the top surface of the conductors is substantially coplanar with the upper surface of the first insulating layer. Furthermore, at least one of the conductors comprises a set of contiguous conducting segments inlaid so as to surround at least one pillar extending substantially to the level of the upper surface of the first insulating layer. The structure may further comprise a second insulating layer deposited over the first insulating layer and the inlaid conductors. This structure may further comprise a second metallization layer (possibly also formed by a damascene process) electrically connected through the second insulating layer to the damascene interconnection layer.

BRIEF DESCRIPTION OF THE DRAWINGS

This invention, including various features and advantages thereof, can be best understood by reference to the following drawings, wherein.

DETAILED DESCRIPTION OF THE PREFERRED EMBODIMENTS

Figure 1A:
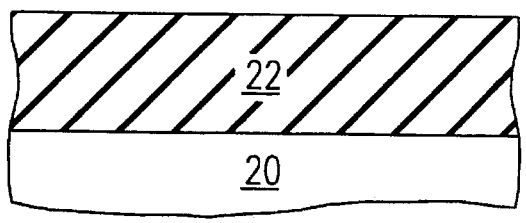
FIGS. 1A–1B and 2A–2B show several steps of a damascene method in general.

A general damascene process is illustrated in FIGS. 1A–1B and 2A–2B. Referring to FIG. 1A, insulating layer 22 (preferably of silicon dioxide) is typically formed on a substrate 20, which usually contains circuitry and may contain other interconnection levels. To achieve good uniformity of thickness for inlaid conductors, layer 22 should be substantially planarized; i.e. undulations in the surface plane of 22 (excluding via locations) should be less than 20% of the desired conductor thickness over lateral distances at least 10 times the minimum line width for a given device.

Figure 1B:
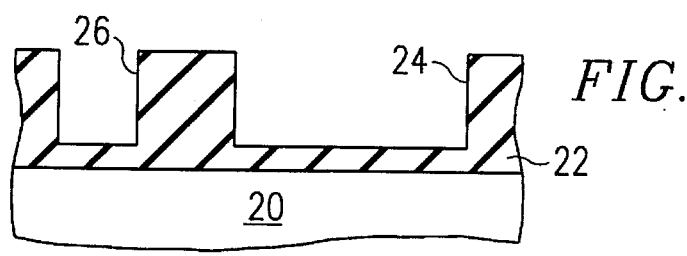

It has long been the practice in semiconductor design to form patterned conductors of different widths. For example, widths are often adjusted based on current-carrying requirements for a given conductor, such that reliability problems (e.g. electromigration) may be avoided. Where low currents are expected, conductor size (and spacing) is however limited to a minimum width specific to a given device and/or semiconductor fabrication process. FIG. 1B shows a cross-section of layer 22 after patterning to create two channels, wide channel 24 and narrow channel 26. These channels are formed by removing a top portion of layer 22 (although in some embodiments the channels may be cut completely through layer 22) using photolithography and a suitable anisotropic etch technique, such as reactive ion etching, which are known in the art.

Figure 2A:
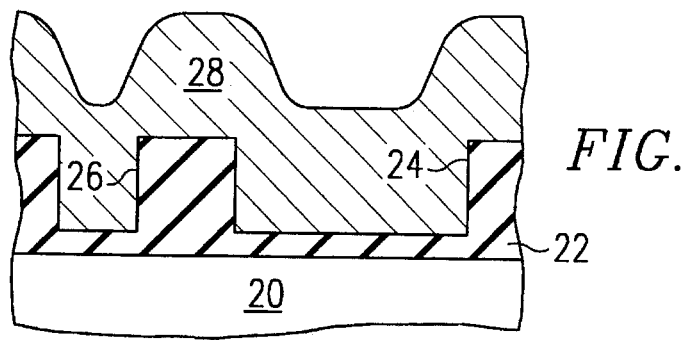

Referring to FIG. 2A, a conducting film 28 is shown over insulating layer 22. Film 28 may, for example, be formed by physical vapor deposition (PVD), chemical vapor deposition, PVD followed by reflow, or electroplating, and preferably is comprised of at least 90% of aluminum, copper, and alloys of the two metals. More specifically, film 28 may be comprised of more than 1 sublayer, such as a 200 Å nominal Ti bottom sublayer, a 200 Å–400 Å CVD or PVD TiN sublayer, and a top sublayer of Al-0.5% Cu alloy. Preferably, film 28 is deposited to a depth such that channels 24 and 26 are completely filled with conducting material.

Figure 2B:
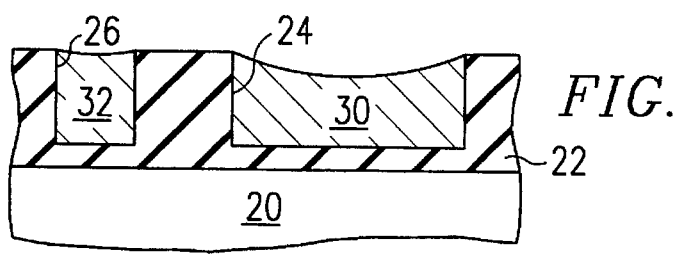

FIG. 2B shows a wide inlaid conductor 30 and a narrow inlaid conductor 32 remaining in channels 24 and 26, respectively, after polishing to remove unneeded sections of film 28. Polishing is preferably accomplished by chemical-mechanical polishing (CMP), wherein a wafer containing substrate 20 and/or a polishing pad are rotatably mounted and brought into contact with each other under rotation. A slurry providing both abrasive and chemically reactive components is supplied, typically to the pad, during polishing. The abrasive component is typically comprised of finely ground colloidal silica or alumina particles. For metal polishing, the chemically reactive component is typically diluted acid and/or hydrogen peroxide, with the remainder of the slurry comprised of deionized water. In general, it is desirable that the slurry composition and polishing conditions (e.g. rotational velocity, polish force, temperature) be adjusted such that the conducting film is selectively removed at a faster rate than the insulating layer (30:1 being a typical ratio) during CMP. One drawback of such a process, however, is illustrated in FIG. 2B. The top surface of narrow conductor 32 is shown as slightly dished but substantially coplanar with the upper surface of insulating layer 22. Wide conductor 30, shown here as 3 times the width of the small conductor (some conductors may be much wider on a given circuit), is shown as both recessed (i.e. overetched) and severely dished. In extreme cases, sections of a wide conductor may be completely removed from the channel during polishing.

Figure 3:
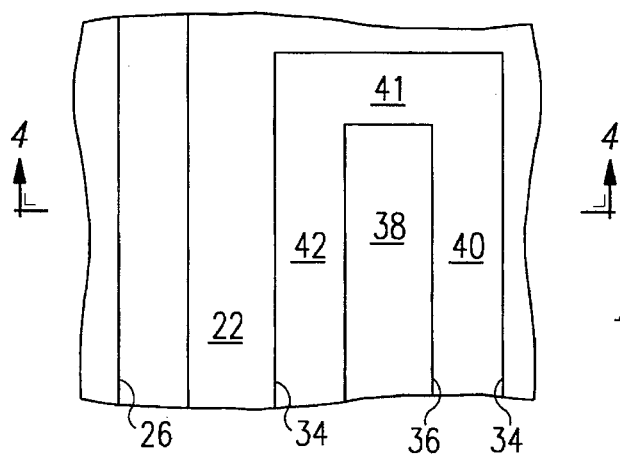
FIGS. 3 and 4–6 show, respectively, a plan view and cross-sectioned elevations taken along second line 4—4, of several steps in the formation of a damascene interconnection layer formed according to the invention.
Figure 4:
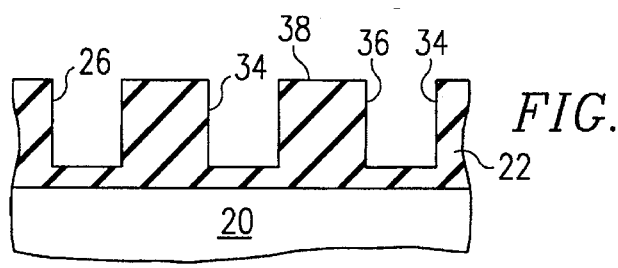

It has now been discovered that damage during polishing may be substantially alleviated by designing pillars into conductors otherwise susceptible to polishing damage. Generally, experimentation with specific conducting and insulating materials and a desired CMP process is required to determine the minimum line width of a conductor which requires such pillars (typically this width may vary from several microns to tens of microns). Accordingly, an embodiment of a channel representative of the present invention is shown in plan view in FIG. 3 and in cross-sectioned elevation taken along section line 4—4 in FIG. 4. Insulating layer 22 may be formed as described previously. However, wide channel 24 of FIG. 1B is replaced with a new channel design 34 in FIGS. 3 and 4. Channel 34 may be described as comprised of contiguous narrow channel segments (including right segment 40, top segment 41, and left segment 42) enclosing an insulating pillar 38 (with an extent defined by inner wall 36) having a top surface substantially coplanar with the upper surface of layer 22.

Figure 5:
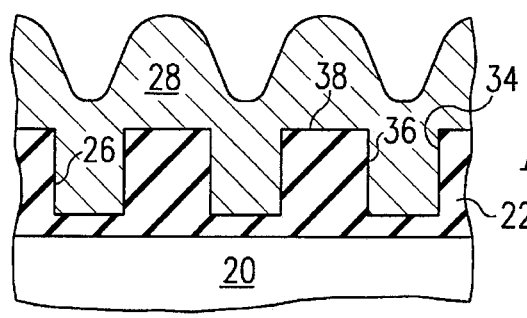
Figure 6:
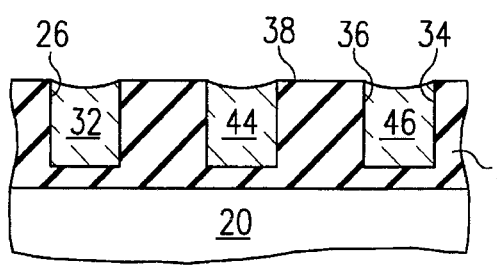

FIG. 5 shows a conducting film 28 deposited over patterned insulating layer 22. Finally, FIG. 6 shows conducting segments 44 and 46 with top surfaces substantially coplanar with the upper surface of layer 22. These segments, as designed, are electrically connected to form multiple conduction paths with a composite cross-section equivalent to that of a single, wider conductor. By incorporation of insulating pillar 38 into channel 34, dishing and overetching during polishing may be avoided, since polish attributes for the wide conductor are actually those of a set of narrower conducting segments separated by one or more pillars.

Figure 7:
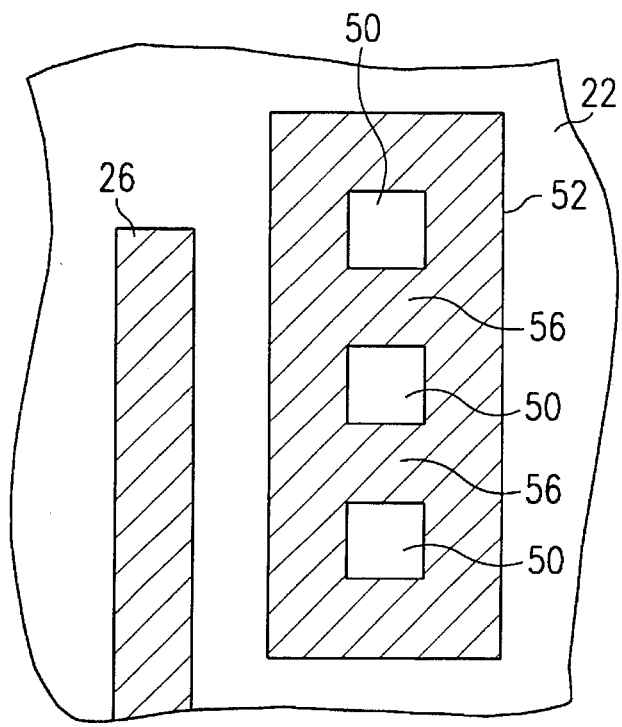
FIGS. 7–11 show plan views of various embodiments of inlaid conductors containing insulating pillars, which may be usable in the invention.
Figure 8:
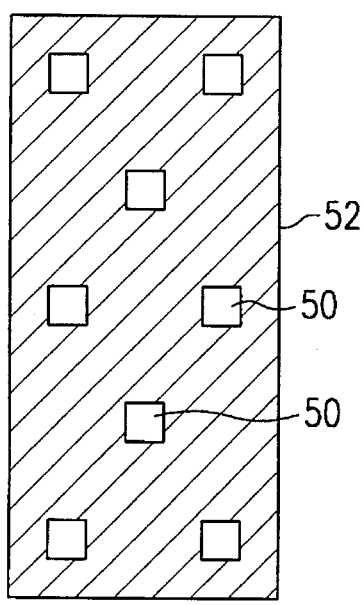
Figure 9:
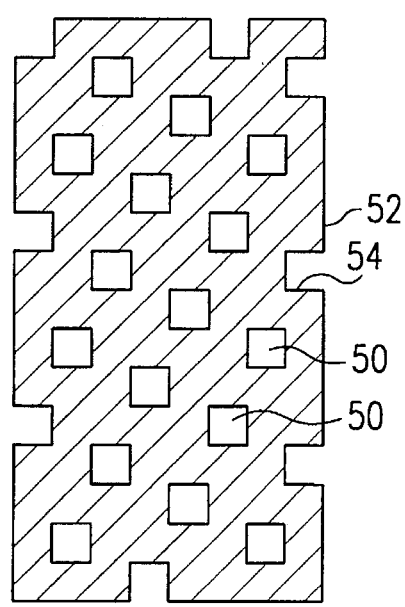
Figure 10:
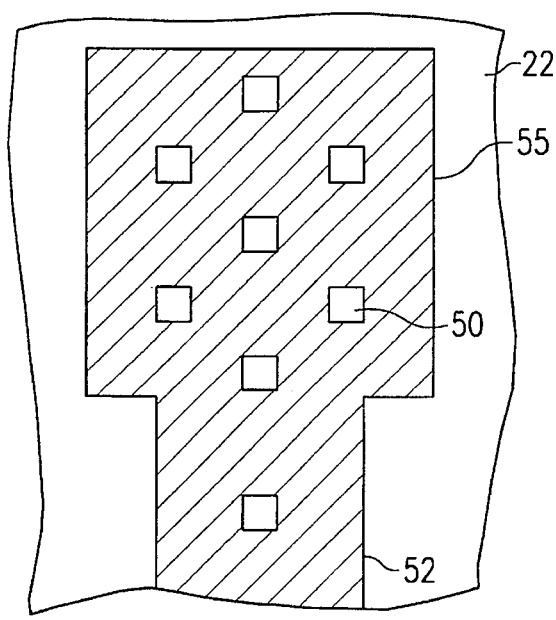
Figure 11:
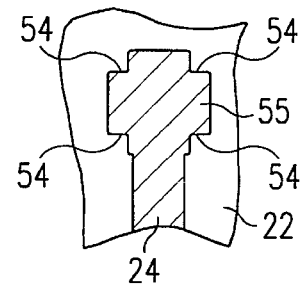

FIG. 7 shows a plan view of a pillared conductor 52 containing two cross-conducting segments 56 and enclosing three pillars 50. Such an arrangement has less resistance and more redundant conduction paths than the wide conductor arrangement of FIG. 5, and yet performs comparably during polish. For conductors requiring a cross-section which allows for more than one pillar across the conductor width, more elaborate pillar patterns, such as those shown for pillared conductors 52 in FIGS. 8 and 9, may be chosen. Note that in these pillar patterns individual conducting segments are less distinct. FIG. 10 shows a reticulated conductor 52 with a pillared landing pad 55 on an end. Some schemes may produce edge pillars 54, as illustrated in FIG. 9. In an extreme case, such as landing pad 55 connected to conductor 24 in FIG. 11, only edge pillars 54 may be included in the pillar pattern.

Figure 12:
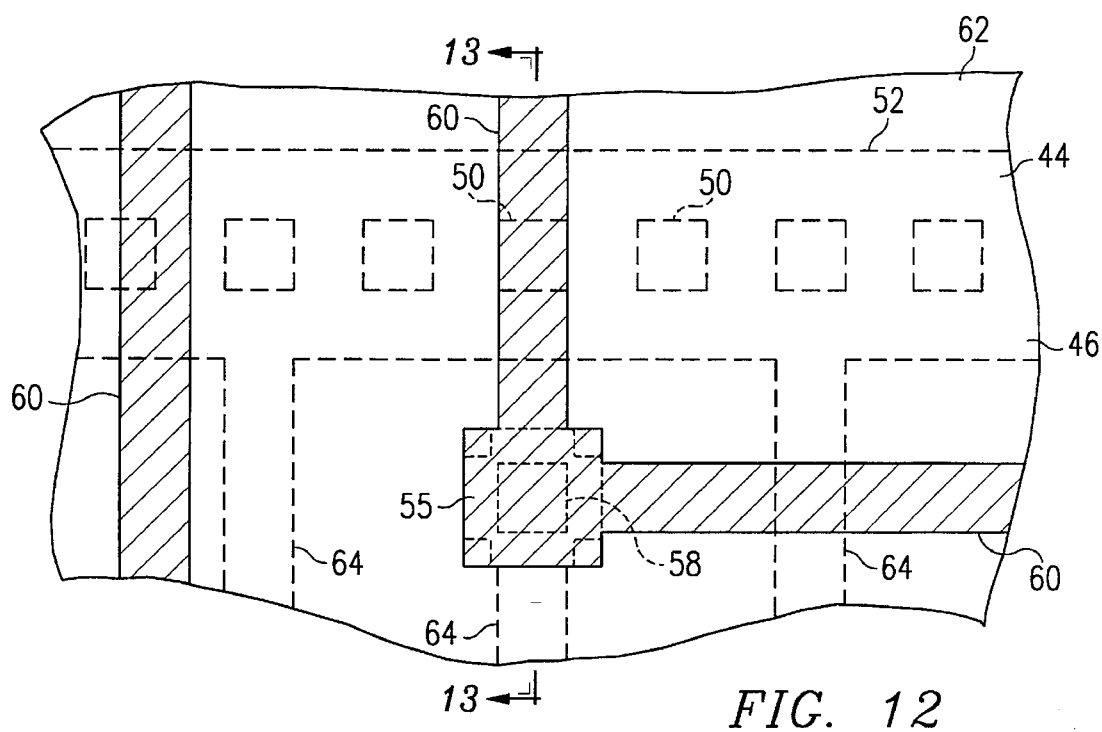
FIGS. 12 and 13 show, respectively, a plan view and a cross-sectioned elevation taken along section line 13—13, of two conducting levels illustrative of the invention.

FIG. 12 is a plan view illustrating a portion of two levels of conductors. The first level of conductors contains a pillared conductor 52 and three non-pillared conductors 64, two of which terminate at conductor 52 and one of which terminates at pillared landing pad 55. The latter conductor is electrically connected through via 58 to one of the conductors 60 of an upper metallization layer (the upper level may or may not be formed by a damascene process).

Figure 13:
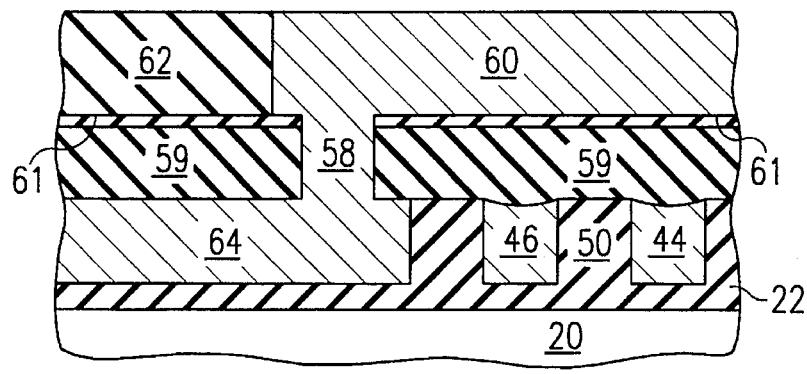

In the cross-sectional elevation taken along line 13—13 and shown in FIG. 13, the layout of interspersed insulating layers is more clearly visible. First insulating layer 22 contains insulating pillars 50 and has an upper surface substantially coplanar with conductors 52 and 64. A second insulating layer 59 (preferably of silicon dioxide) may be deposited over these conductors and first insulating layer 22. In some embodiments, such as a dual damascene scheme known in the art, a via hard mask 61 (e.g. of silicon nitride) may be deposited over layer 59 and patterned at the location of via 58. A third insulating layer 62 may be layed over hard mask 61, such that 59, 61, and 62 may also be described as sublayers of a damascene insulating layer. During patterning of such, hard mask 61 may be used as a stop in a selective etch such that a channel is formed by removing the topmost sublayer, e.g. third insulating layer 62, in a predefined area. In this case, the previously described via pattern leaves an opening in mask 61, allowing via 58 to be formed by the same etch that forms the channel for inlaid conductor 60.

Figure 14A:
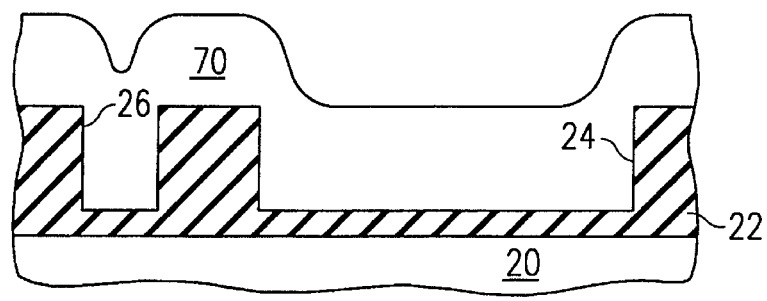
FIGS. 14A–14B show a several step method of forming a pillar from a pillar forming material deposited in a channel.
Figure 14B:
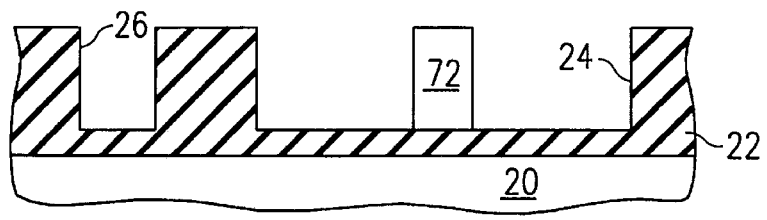

The above embodiments have mainly illustrated designs wherein pillars are constructed at the same nine as outer channel walls, and from the same layer of insulating material. This has an advantage in requiring a minimum of changes in processing. However, it is also possible to complete a channel as in FIG. 1B and then form a pillar within the channel from a separate deposition. For example, if the channels are patterned in a silicon dioxide layer, pillars may be formed from a silicon nitride deposition. Alternately, pillars may be formed of a conductive material, such as tungsten, which polishes slower than the metal or alloy forming the remainder of the conductor. In either case, FIGS. 14A and 14B show how such a pillar may be constructed. A pillar forming material 70 (which may either by insulative or conductive) may be deposited over insulating layer 22 after channel patterning, preferably to a depth substantially equal to the channel depth. Pillar forming material 70 may subsequently be patterned to form pillar 72 within channel 24, with further steps to complete damascene processing following those previously described.

The invention is not to be construed as limited to the particular examples described herein, as these are to be regarded as illustrative, rather than restrictive. The principles discussed herein may be used to design many other pillar and/or conductor patterns not shown herein which produce the same effect. In general, supports such as pillars of any nature which prevent damage to large conductors during polishing are comprehended by the invention. The conductors themselves may be formed of virtually any conducting material compatible with a semiconductor process, with Ti, TiN, TiW, W, Al, Cu, Pd, and combinations of these, either as alloys or as sequential sublayers, being examples of usable materials. The insulating materials described herein (silicon dioxide and silicon nitride, separate and in combination) are illustrative, with organic-containing dielectrics, spin-on glass, etc., being other possibilities. Pillars may be formed to minimum design rule specifications, in at least one horizontal dimension, for a given semiconductor device to minimize resistance. However, conducting segment width (i.e. pillar to pillar spacing and pillar to outer conductor wall spacing) may be set to any level which a practitioner deems to provide acceptable protection from polish damage.

What is claimed is:

1. A semiconductor device having a damascene metallization structure thereon, said structure comprising:

an insulating layer formed on a substrate, said insulating layer having a substantially planar upper surface with a plurality of channels formed therein;

at least one pillar formed within said channels and extending substantially to the level of said upper surface; and conductors inlaid in said channels such that the top surface of said conductors is substantially coplanar with said insulating layer upper surface, at least one of said conductors comprising a set of contiguous conducting segments inlaid such as to surround said pillar.

2. The structure of claim 1, wherein said pillar is formed of an insulative material.

3. The structure of claim 1, further comprising a second insulating layer over said first insulating layer and said conductors.

4. The structure of claim 3, further comprising a metallization layer electrically connected through said second insulating layer to said damascene metallization structure.

* * * * *